US009356873B2

(12) United States Patent
Yun et al.

(10) Patent No.: US 9,356,873 B2
(45) Date of Patent: May 31, 2016

(54) BACKBONE CHANNEL MANAGEMENT METHOD AND BACKBONE CHANNEL MANAGEMENT APPARATUS

(71) Applicant: SAMSUNG ELECTRONICS CO., LTD., Suwon-Si, Gyeonggi-Do (KR)

(72) Inventors: Jae-Geun Yun, Hwaseong-Si (KR); Bub-Chul Jeong, Yongin-Si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 104 days.

(21) Appl. No.: 14/053,813

(22) Filed: Oct. 15, 2013

(65) Prior Publication Data

US 2014/0112141 A1 Apr. 24, 2014

(30) Foreign Application Priority Data

Oct. 19, 2012 (KR) .................. 10-2012-0116572

(51) Int. Cl.
G06F 13/28 (2006.01)
H04L 12/803 (2013.01)
H04L 25/14 (2006.01)
H04L 12/933 (2013.01)

(52) U.S. Cl.
CPC .............. H04L 47/125 (2013.01); H04L 25/14 (2013.01); H04L 49/109 (2013.01)

(58) Field of Classification Search
CPC .................... H04L 47/125; H04L 49/109
See application file for complete search history.

(56) References Cited

U.S. PATENT DOCUMENTS

| 7,277,449 | B2 | 10/2007 | Garinger et al. | |
| 7,590,721 | B2 | 9/2009 | Alfano | |
| 7,856,011 | B2 | 12/2010 | Alfano | |
| 7,877,524 | B1* | 1/2011 | Annem et al. | 710/26 |
| 7,957,381 | B2 | 6/2011 | Clermidy et al. | |
| 8,032,676 | B2* | 10/2011 | Wingard et al. | 710/107 |
| 8,213,298 | B2 | 7/2012 | Yamaguchi et al. | |
| 8,271,700 | B1* | 9/2012 | Annem et al. | 710/26 |
| 2002/0036996 | A1* | 3/2002 | Ozluturk et al. | 370/335 |
| 2004/0190553 | A1 | 9/2004 | Ward et al. | |
| 2007/0115939 | A1 | 5/2007 | Lee et al. | |
| 2009/0024783 | A1* | 1/2009 | Rhim et al. | 710/316 |
| 2009/0109996 | A1 | 4/2009 | Hoover et al. | |
| 2009/0210883 | A1 | 8/2009 | Hoover et al. | |
| 2009/0274049 | A1 | 11/2009 | Lai | |
| 2009/0282197 | A1 | 11/2009 | Comparan et al. | |
| 2010/0080229 | A1* | 4/2010 | Scandurra et al. | 370/392 |
| 2011/0085550 | A1* | 4/2011 | Lecler et al. | 370/392 |
| 2011/0191088 | A1 | 8/2011 | Hsu et al. | |
| 2011/0302345 | A1* | 12/2011 | Boucard et al. | 710/123 |
| 2013/0051385 | A1* | 2/2013 | Jayasimha et al. | 370/389 |
| 2014/0086247 | A1* | 3/2014 | Boucard et al. | 370/392 |

FOREIGN PATENT DOCUMENTS

JP 2006254449 9/2006
JP 2009110512 5/2009

(Continued)

Primary Examiner — Jay P Patel
(74) Attorney, Agent, or Firm — Volentine & Whitt, PLLC

(57) ABSTRACT

A backbone channel transmits first through third channel packets among Advanced eXtensible Interface (AXI) 5 channel packets. The backbone channel is managed by dividing the backbone channel into a first sub-channel and a second sub-channel, transmitting the first channel packet through the first sub-channel, transmitting the second channel packet through the second sub-channel, and transmitting the third channel packet through both the first sub-channel and the second sub-channel.

20 Claims, 15 Drawing Sheets

(56) References Cited

FOREIGN PATENT DOCUMENTS

| JP | 4592800 | 9/2010 |
|----|---------|--------|
| KR | 0675850 | 1/2007 |
| KR | 0932916 | 12/2009 |
| KR | 1033245 | 4/2011 |

* cited by examiner

FIG. 3

| TYPE(000) | AWID | AWLEN | AWSIZE | AWBURST | AWLOCK | AWCACHE | AWPROT | RESERVED |
|---|---|---|---|---|---|---|---|---|
| WRITE MEMORY ADDRESS | | | | | | | | |

FIG. 4

| TYPE(011) | WID | RESERVED | WSTRB | END OF BURST |
|---|---|---|---|---|
| | | WRITE DATA | | |
| | | WRITE DATA | | |

FIG. 5

| TYPE(001) | ARID | ARLEN | ARSIZE | ARBURST | ARLOCK | ARCACHE | ARPROT | RESERVED |
|---|---|---|---|---|---|---|---|---|
| READ MEMORY ADDRESS |||||||||

FIG. 6

| TYPE(010) | RID | RESERVED | RRESP | END OF BURST |
|---|---|---|---|---|
| | | READ DATA | | |
| | | READ DATA | | |

FIG. 7

| TYPE(100) | BID | RESERVED | BRESP | RESEVED |

BACKBONE CHANNEL MANAGEMENT METHOD AND BACKBONE CHANNEL MANAGEMENT APPARATUS

CROSS-REFERENCE TO RELATED APPLICATION(S)

This application claims priority under 35 USC §119 to Korean Patent Application No. 10-2012-0116572 filed on Oct. 19, 2012, the subject matter of which is hereby incorporated by reference.

BACKGROUND OF THE INVENTION

The inventive concept relates generally to backbone channel management. More particularly, certain embodiments of the inventive concept relate to a backbone channel management method and a backbone channel management apparatus based on Advanced eXtensible Interface (AXI) protocol.

A system on chip (SoC) typically comprises a plurality of intellectual properties (IPs) that communicate with each other through various interconnections. In a typically SoC, efficient implementation of the interconnections can contribute to better system performance.

In some SoCs, IPs are connected to each other through a bus architecture, and in others, they are connected through a network on chip (NoC) topology. The NoC topology is a general network topology, and it can generally support a high density, high data flow SoC. In addition, it may allow an SoC to function at relatively high speed and with relatively low power consumption.

An SoC comprising master IPs and slave IPs may operate based on the AXI protocol. Such an SoC may use a backbone bus having a wide bit width (e.g., more than 128 bits) to reduce wire congestion and simplify implementation. However, a backbone bus having a wide bit width may reduce channel utilization while transmitting packets having different bit widths, which can decrease performance and power efficiency. It may also increase read latency and decrease the efficiency of memory scheduling.

SUMMARY OF THE INVENTION

In one embodiment of the inventive concept, a method is provided for managing a backbone channel that transmits first through third channel packets among AXI 5 channel packets. The method comprises dividing the backbone channel into a first sub-channel and a second sub-channel, transmitting the first channel packet through the first sub-channel, transmitting the second channel packet through the second sub-channel, and transmitting the third channel packet through both the first sub-channel and the second sub-channel.

In another embodiment of the inventive concept backbone channel management apparatus transmits first through third channel packets among AXI 5 channel packets through a backbone channel. The apparatus comprises a transmitting interface unit and a receiving interface unit. The transmitting interface unit comprises an input buffer having first through third input packet buffers that store the first through third channel packets, respectively, and a transmitting channel management unit configured to divide the backbone channel into a first sub-channel and a second sub-channel, to transmit the first channel packet provided from the first input packet buffer using the first sub-channel, to transmit the second channel packet provided from the second input packet buffer using the second sub-channel, and to transmit the third channel packet provided from the third input packet buffer using both the first sub-channel and the second sub-channel. The receiving interface unit comprises an output buffer having first through third output packet buffers, and a receiving channel management unit configured to store the first channel packet received through the first sub-channel into the first output packet buffer, to store the second channel packet received through the second sub-channel into the second output packet buffer, and to store the third channel packet received through both the first sub-channel and the second sub-channel into the third output packet buffer.

These and other embodiments of the inventive concept can potentially improve channel utilization, which can improve performance and power efficiency, decrease read latency, and increase the efficiency of memory scheduling.

BRIEF DESCRIPTION OF THE DRAWINGS

The drawings illustrate selected embodiments of the inventive concept. In the drawings, like reference numbers indicate like features.

FIG. 3 is a diagram illustrating a structure of a packet transmitted through an AXI 5 channel, according to an embodiment of the inventive concept.

FIG. 4 is a diagram illustrating a structure of a packet transmitted through an AXI 5 channel, according to an embodiment of the inventive concept.

FIG. 5 is a diagram illustrating a structure of a packet transmitted through an AXI 5 channel, according to an embodiment of the inventive concept.

FIG. 6 is a diagram illustrating a structure of a packet transmitted through an AXI 5 channel, according to an embodiment of the inventive concept.

FIG. 7 is a diagram illustrating a structure of a packet transmitted through an AXI 5 channel, according to an embodiment of the inventive concept.

DETAILED DESCRIPTION

Embodiments of the inventive concept are described below with reference to the accompanying drawings. These embodiments are presented as teaching examples and should not be construed to limit the scope of the inventive concept.

In the description that follows, the terms first, second, etc. may be used to describe various elements, but these elements should not be limited by these terms. Rather, these terms are used merely to distinguish one element from another. For example, a first element could be termed a second element, and vice versa, without materially changing the meaning of the relevant description. As used herein, the term "and/or" indicates any and all combinations of one or more of the associated listed items.

Where an element is referred to as being "connected" to another element, it can be directly connected to the other element or intervening elements may be present. Other words used to describe relationships between elements should be interpreted in similar fashion.

The terminology used herein is for the purpose of describing particular embodiments only and is not intended to be limiting of the inventive concept. As used herein, the singular forms "a," "an" and "the" are intended to encompass the plural forms as well, unless the context clearly indicates otherwise. Terms such as "comprises," "comprising," "includes" and/or "including," indicate the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

Figure 1:
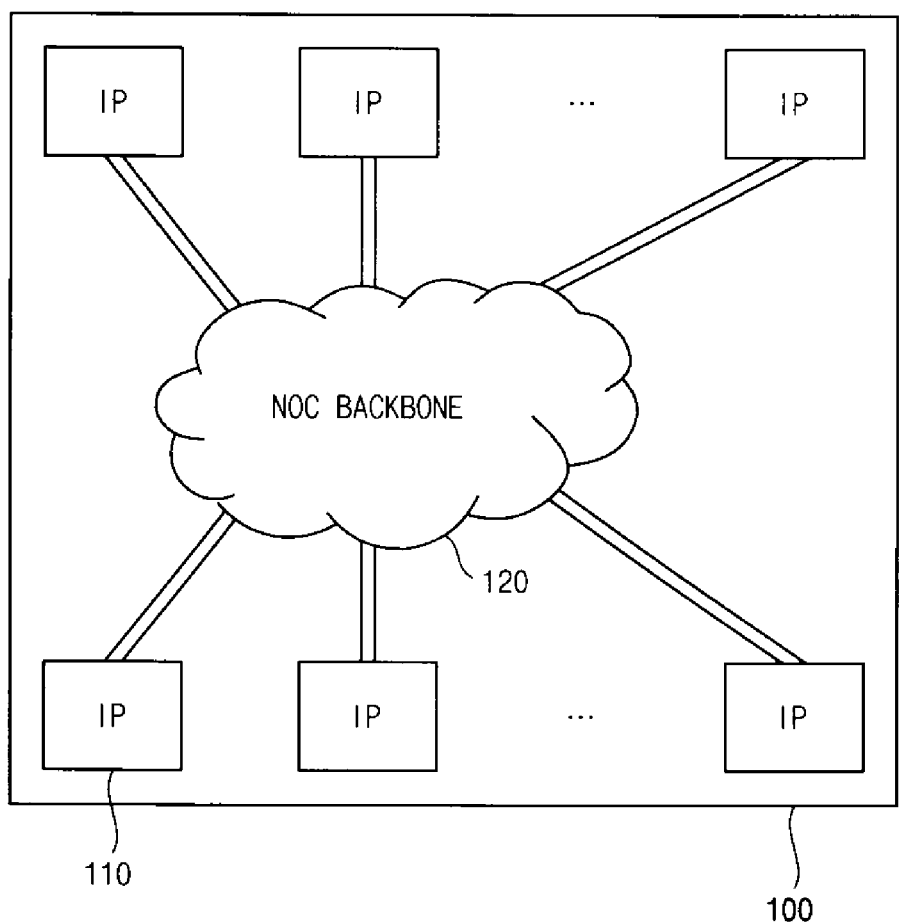
FIG. 1 is a block diagram of an NoC system based on the AXI protocol, according to an embodiment of the inventive concept.

FIG. 1 is a block diagram illustrating an NoC system based on the AXI protocol, according to an embodiment of the inventive concept.

Referring to FIG. 1, an NoC system 100 comprises multiple IPs 110 interconnected with an NoC backbone 120. IPs 110 exchange data with each other through NoC backbone 120. For example, a master IP among IPs 110 may communicate with a slave IP among IPs 110 using at least one router in NoC backbone 120. NoC backbone 120 routes packets or flits complying with AXI protocol between IPs 110. For example, the master IP may transmit a packet to write data in the slave IP or to read data from the slave IP. The packet typically comprises a header and a payload.

NoC backbone 120 routes the packet between the master IP and the slave IP using a destination address in the packet. The packet may be divided into flits and transmitted in units of a flit. Therefore, data transmitted between IPs 110 may have a form of a packet or a flit.

Figure 2:
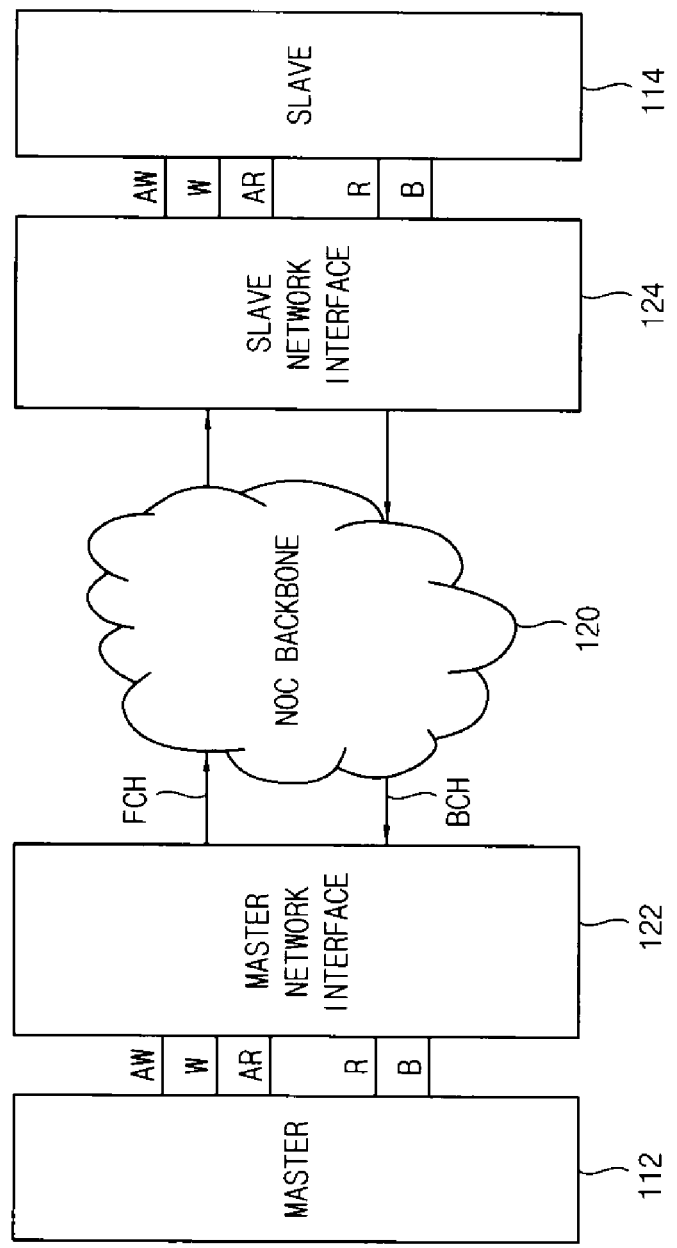
FIG. 2 is a block diagram illustrating an example of the NoC system of FIG. 1, according to an embodiment of the inventive concept.

FIG. 2 is a block diagram illustrating an example of NoC system 100, according to an embodiment of the inventive concept.

Referring to FIG. 2, NoC system 100 comprises a master IP 112, a master network interface 122, an NoC backbone 120, a slave network interface 124 and a slave IP 114.

Master IP 112 and slave IP 114 transmit and receive data based on the AXI protocol. For example, master IP 112 and slave IP 114 may transmit and receive data using AXI 5 channels, that is, a write address channel AW, a write data channel W, a read address channel AR, a read data channel R, and a write response channel B.

Master network interface 122 serializes packets received from master IP 112 through write address channel AW, write data channel W and read address channel AR, and it transmits the serialized packets through a forward channel FCH. It also de-serializes packets received through a backward channel BCH and transmits the de-serialized packets to master IP 112 through read data channel R and write response channel B.

Slave network interface 124 de-serializes packets received through forward channel FCH and transmits the de-serialized packets to slave IP 114 through write address channel AW, write data channel W, and read address channel AR. It also serializes packets received from slave IP 114 through read data channel R and write response channel B and transmits the serialized packets through backward channel BCH.

As an example, assume that identification (ID) width of a packet is 12 bits, a bit width of write address channel AW is 66 bits, a bit width of read address channel AR is 66 bits, a bit width of write data channel W is 157 bits, a bit width of read data channel R is 143 bits, and a bit width of write response channel B is 14 bits. Under these circumstances, a bit width of forward channel FCH is greater than or equal to 157 bits, and a bit width of backward channel BCH is greater than or equal to 143 bits. While a write address or a read address having 66 bits width is transmitted through forward channel FCH, forward channel FCH may be wasted according to a ratio of (157-66)/157. Similarly, while a write response having 14 bits width is transmitted through backward channel BCH, backward channel BCH may be wasted according to a ratio of (143-14)/143.

In addition, because a read address is serialized together with a write address and write data in forward channel FCH, transmission of the read address may be delayed due to the write address and the write data, which can increase read latency. Bit widths of write address channel AW, write data channel W, read address channel AR, read data channel R, and write response channel B may vary in different embodiments.

FIGS. 3 to 7 are diagrams illustrating structures of packets transmitted through AXI 5 channels, according to embodiments of the inventive concept.

Referring to FIG. 3, a write address packet transmitted through write address channel AW comprises a header and a payload. The header of the write address packet comprises a packet type TYPE, a write address identification AWID, a burst length AWLEN, a burst size AWSIZE, a burst type AWBURST, a lock type AWLOCK, a cache type AWCACHE, and a protection type AWPROT. The payload of the write address packet comprises a write address.

Referring to FIG. 4, a write data packet transmitted through write data channel W comprises a header and a payload. The header of the write data packet comprises a packet type TYPE, a write identification WID, a write strobe WSTRB, and an information indicating the last transfer in a write burst END OF BURST. The payload of the write data packet comprises write data.

Referring to FIG. 5, a read address packet transmitted through read address channel AR comprises a header and a payload. The header of the read address packet comprise a packet type TYPE, a read address identification ARID, a burst length ARLEN, a burst size ARSIZE, a burst type ARBURST, a lock type ARLOCK, a cache type ARCACHE, and a protection type ARPROT. The payload of the read address packet comprises a read address.

Referring to FIG. 6, a read data packet transmitted through read data channel R comprises a header and a payload. The header of the read data packet comprise a packet type TYPE, a read identification RID, a read response RRESP, and information indicating the last transfer in a read burst END OF BURST. The payload of the read data packet comprises read data.

Referring to FIG. 7, a write response packet transmitted through write response channel B comprises a header without a payload. The header of the write response packet comprises a packet type TYPE, a response identification BID, and a write response BRESP.

In FIGS. 3 to 7, packet type TYPE indicates one of the write address packet, the write data packet, the read address packet, the read data packet, and the write response packet. Write identification WID of the write data packet and response identification BID in the write response packet may match the write address identification AWID in the write address packet. Read identification RID in the read data packet may match the read address identification ARID in the read address packet. Lock type AWLOCK and ARLOCK represent one of a normal access, an exclusive access, and a locked access. Cache type AWCACHE and ARCACHE indicate whether the transaction may use a cache memory. The protection type AWPROT and ARPROT represents a protection level. Read response RRESP in the read data packet and write response BRESP included in the write response packet represent one of a successful access, a slave error and a transaction address error.

As described above with reference to FIGS. 3 to 7, headers of packets transmitted through AXI 5 channels may include various kinds of information for transmissions, and payloads of the packets may include addresses and data.

Figure 8:
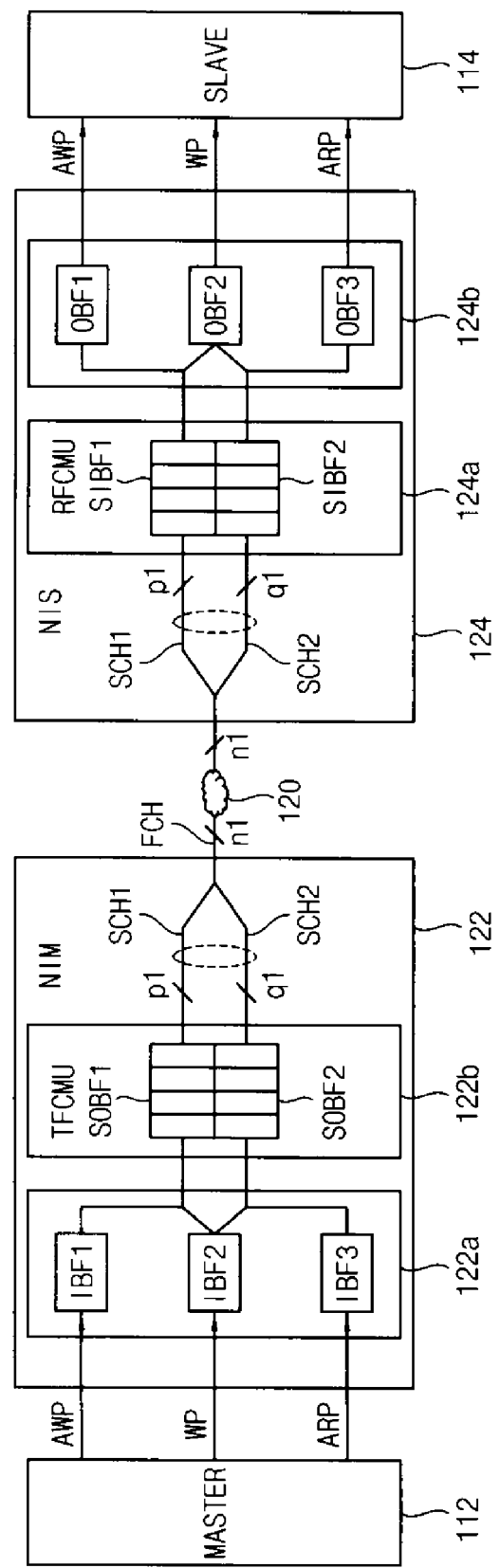
FIG. 8 is a block diagram illustrating an example of a master network interface and a slave network interface of a forward channel included in the NoC system of FIG. 2, according to an embodiment of the inventive concept.

FIG. 8 is a block diagram illustrating an example of a master network interface and a slave network interface of a forward channel included in the NoC system of FIG. 2, according to an embodiment of the inventive concept.

Referring to FIG. 8, master network interface NIM 122 comprises an input buffer 122a and a transmitting forward channel management unit TFCMU 122b.

Input buffer 122a comprises first through third input packet buffers IBF1, IBF2 and IBF3. First through third input packet buffers IBF1, IBF2 and IBF3 store a write address packet AWP, a write data packet WP and a read address packet ARP received from master IP 112 through write address channel AW, write data channel W, and read address channel AR, respectively.

A bit width of forward channel FCH of NoC backbone 120 may be n1 bits (e.g., greater than or equal to 157 bits). Forward channel FCH comprises a first sub-channel SCH1 and a second sub-channel SCH2, such that the FCH may be divided into the first sub-channel SCH1 and the second sub-channel SCH2. A bit width of first sub-channel SCH1 is p1 bits, e.g., greater than or equal to 66 bits. Write address packet AWP, which has a bit width of u bits, e.g., 66 bits, is transmitted through first sub-channel SCH1. A bit width of second sub-channel SCH2 is q1 bits, e.g., greater than or equal to 66 bits. Read address packet ARP, which has a bit width of v bits, e.g., 66 bits, is transmitted through second sub-channel SCH2.

Transmitting forward channel management unit 122b comprises a first sub-channel output buffer SOBF1 corresponding to first sub-channel SCH1 and a second sub-channel output buffer SOBF2 corresponding to second sub-channel SCH2. Write address packet AWP, write data packet WP and read address packet ARP provided from first through third input packet buffers IBF1, IBF2 and IBF3 are serialized in first sub-channel output buffer SOBF1 and second sub-channel output buffer SOBF2.

Transmitting forward channel management unit 122b transmits write data packet WP, which is stored both in first sub-channel output buffer SOBF1 and second sub-channel output buffer SOBF2, using both first sub-channel SCH1 and second sub-channel SCH2. It also transmits write address packet AWP, which is stored in first sub-channel output buffer SOBF1, using first sub-channel SCH1, and transmits read address packet ARP, which is stored in second sub-channel output buffer SOBF2, using second sub-channel SCH2.

Slave network interface NIS 124 comprises a receiving forward channel management unit RFCMU 124a and an output buffer 124b. Output buffer 124b comprises first through third output packet buffers OBF1, OBF2 and OBF3.

Receiving forward channel management unit 124a comprises a first sub-channel input buffer SIBF1 corresponding to first sub-channel SCH1 and a second sub-channel input buffer SIBF2 corresponding to second sub-channel SCH2. Write address packet AWP, write data packet WP and read address packet ARP received through first sub-channel SCH1 and second sub-channel SCH2 may be de-serialized using sub-channel handshaking in the first sub-channel input buffer SIBF1 and the second sub-channel input buffer SIBF2, and stored in the first through third output packet buffers OBF1, OBF2 and OBF3, respectively. First through third output packet buffers OBF1, OBF2 and OBF3 provide write address packet AWP, write data packet WP and read address packet ARP to slave IP 114 through write address channel AW, write data channel W and read address channel AR, respectively.

Figure 9:
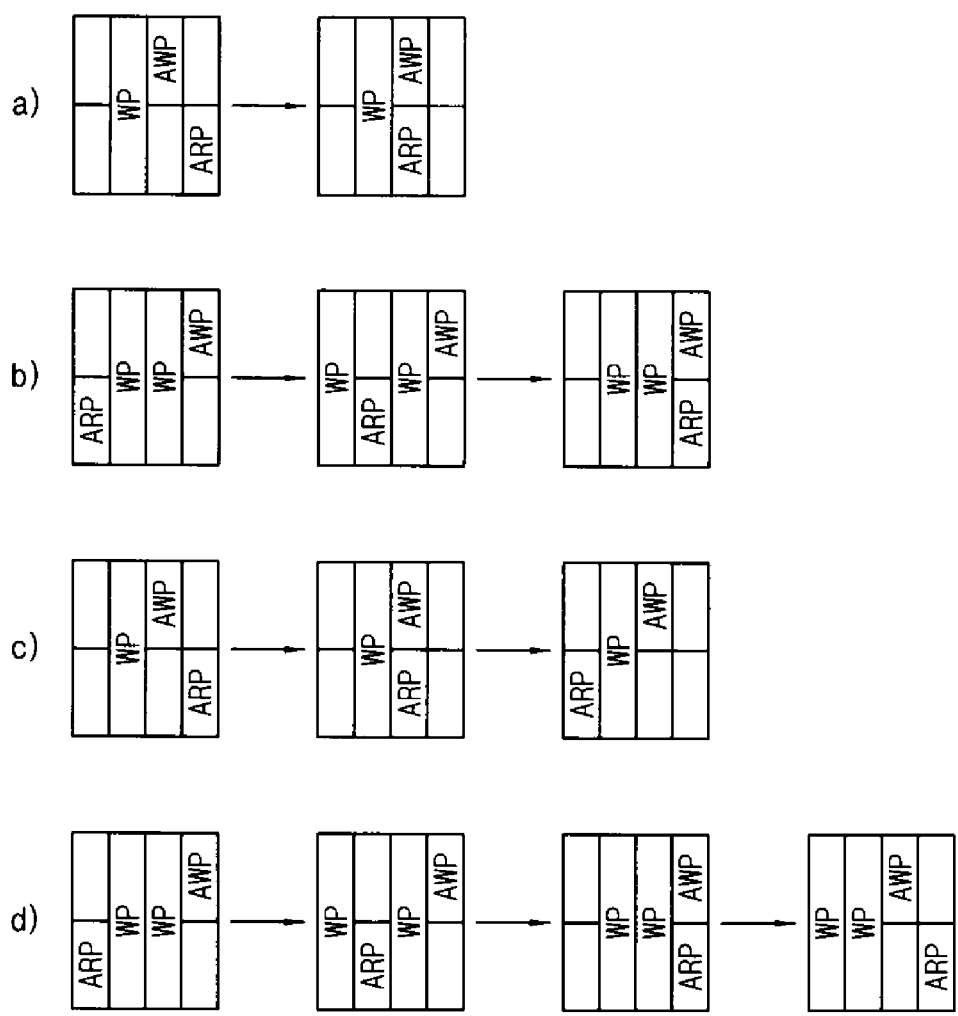
FIG. 9 is a diagram illustrating an operation of a transmitting forward channel management unit in the master network interface of FIG. 8, according to an embodiment of the inventive concept.

FIG. 9 is a diagram illustrating an operation of a transmitting forward channel management unit included in a master network interface of FIG. 8, according to an embodiment of the inventive concept.

Transmitting forward channel management unit 122b manages first sub-channel SCH1 and second sub-channel SCH2 using sub-channel handshaking as follows. Where both first sub-channel SCH1 and second sub-channel SCH2 are available, transmitting forward channel management unit 122b maintains an order of write address packet AWP, write data packet WP and read address packet ARP that are serialized in first sub-channel output buffer SOBF1 and second sub-channel output buffer SOBF2. Therefore, write address packet AWP, write data packet WP and read address packet ARP may be transmitted at different times with each other.

As illustrated in a diagram "A" of FIG. 9, where both first sub-channel SCH1 and second sub-channel SCH2 are blocked and read address packet ARP precedes write address packet AWP in first sub-channel output buffer SOBF1 and second sub-channel output buffer SOBF2, transmitting forward channel management unit 122b moves read address packet ARP in second sub-channel output buffer SOBF2 so that read address packet ARP is merged with write address packet AWP. Therefore, transmitting forward channel management unit 122b transmits write address packet AWP and read address packet ARP at the same time using first sub-channel SCH1 and second sub-channel SCH2, respectively, which tends to increase utilization of forward channel FCH.

As illustrated in a diagram "B" of FIG. 9, where both first sub-channel SCH1 and second sub-channel SCH2 are blocked and read address packet ARP follows write address packet AWP in first sub-channel output buffer SOBF1 and second sub-channel output buffer SOBF2, transmitting forward channel management unit 122b reorders read address packet ARP and write data packet WP and moves read address packet ARP in second sub-channel output buffer SOBF2 so that read address packet ARP is merged with write address packet AWP. Therefore, transmitting forward channel management unit 122b transmits write address packet AWP and read address packet ARP at the same time using first sub-channel SCH1 and second sub-channel SCH2, respectively, which tends to increase utilization of forward channel FCH.

As illustrated in a diagram "C" of FIG. 9, where only second sub-channel SCH2 is blocked and read address packet ARP precedes write address packet AWP in first sub-channel output buffer SOBF1 and second sub-channel output buffer SOBF2, transmitting forward channel management unit 122b reorders read address packet ARP and write data packet WP and moves read address packet ARP in second sub-channel output buffer SOBF2 so that write address packet AWP and write data packet WP precede read address packet ARP. Therefore, transmitting forward channel management unit 122b transmits write address packet AWP and write data packet WP before read address packet ARP.

As illustrated in a diagram "D" of FIG. 9, where only first sub-channel SCH1 is blocked and read address packet ARP follows write address packet AWP in first sub-channel output buffer SOBF1 and second sub-channel output buffer SOBF2, transmitting forward channel management unit 122b reorders read address packet ARP and write data packet WP and moves read address packet ARP in second sub-channel output buffer SOBF2 so that read address packet ARP precedes write address packet AWP and write data packet WP. Therefore, transmitting forward channel management unit 122b transmits read address packet ARP before write address packet AWP and write data packet WP.

Figure 10:
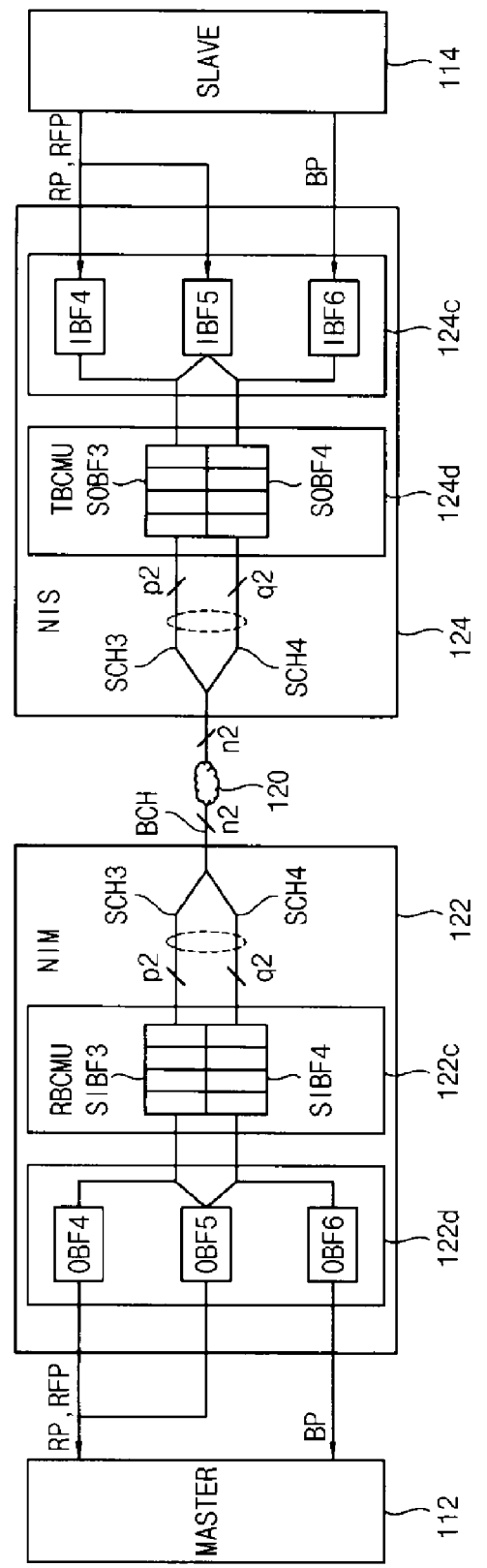
FIG. 10 is a block diagram illustrating an example of a master network interface and a slave network interface of a backward channel included in an NoC system of FIG. 2, according to an embodiment of the inventive concept.

FIG. 10 is a block diagram illustrating an example of a master network interface and a slave network interface of a backward channel included in the NoC system of FIG. 2, according to an embodiment of the inventive concept.

Referring to FIG. 10, slave network interface NIS 124 comprises an input buffer 124c and a transmitting backward channel management unit TBCMU 124d.

Input buffer 124c comprises fourth through sixth input packet buffers IBF4, IBF5 and IBF6. Fourth input packet buffer IBF4 and fifth input packet buffer IBF5 store a read data packet RP and a read data and read response packet RFP (hereafter, "read data/response packet RFP"), respectively, received from slave IP 114 through read data channel R. Read data packet RP comprises only the read data, and packet RFP comprises both the read data and the read response. Sixth input packet buffer IBF6 stores a write response packet BP received from slave IP 114 through write response channel B.

A bit width of backward channel BCH of NoC backbone is n2 bits, e.g., greater than or equal to 143 bits. Backward channel BCH comprises a third sub-channel SCH3 and a fourth sub-channel SCH4, such that the BCH may be divided into the third sub-channel SCH3 and the fourth sub-channel SCH4. A bit width of third sub-channel SCH3 comprises p2 bits, e.g., greater than or equal to 128 bits. Read data packet RP, which has a bit width of s bits, e.g., 128 bits, is transmitted using third sub-channel SCH3. A bit width of fourth sub-channel SCH4 is q2 bits, e.g., greater than or equal to 14 bits. Write response packet BP, which has a bit width of t bits, e.g., 14 bits, is transmitted using fourth sub-channel SCH4.

Transmitting backward channel management unit 124d comprises a third sub-channel output buffer SOBF3 corresponding to third sub-channel SCH3 and a fourth sub-channel output buffer SOBF4 corresponding to fourth sub-channel SCH4. Read data packet RP, read data/response packet RFP and write response packet BP provided from fourth through sixth input packet buffers IBF4, IBF5 and IBF6 are serialized in third sub-channel output buffer SOBF3 and fourth sub-channel output buffer SOBF4.

Transmitting backward channel management unit 124d transmits read data/response packet RFP, which is stored both in third sub-channel output buffer SOBF3 and fourth sub-channel output buffer SOBF4, using both third sub-channel SCH3 and fourth sub-channel SCH4. It also transmits read data packet RP, which is stored in the third sub-channel output buffer SOBF3, using third sub-channel SCH3, and transmits write response packet BP, which is stored in the fourth sub-channel output buffer SOBF4, using fourth sub-channel SCH4.

Master network interface NIM 122 comprises a receiving backward channel management unit RBCMU 122c and an output buffer 122d. Output buffer 122d comprises fourth through sixth output packet buffers OBF4, OBF5 and OBF6.

Receiving backward channel management unit 122c comprises a third sub-channel input buffer SIBF3 corresponding to third sub-channel SCH3 and a fourth sub-channel input buffer SIBF4 corresponding to fourth sub-channel SCH4. Read data packet RP, read data/response packet RFP and write response packet BP received through third sub-channel SCH3 and fourth sub-channel SCH4 are de-serialized using sub-channel handshaking in third sub-channel input buffer SIBF3 and fourth sub-channel input buffer SIBF4, and stored in fourth through sixth output packet buffers OBF4, OBF5 and OBF6, respectively. Fourth output packet buffer OBF4 and fifth output packet buffer OBF5 provide read data packet RP and read data/response packet RFP to master IP 112, respectively, through read data channel R. Sixth output packet buffer OBF6 provides write response packet BP to master IP 112 through write response channel B.

Figure 11:
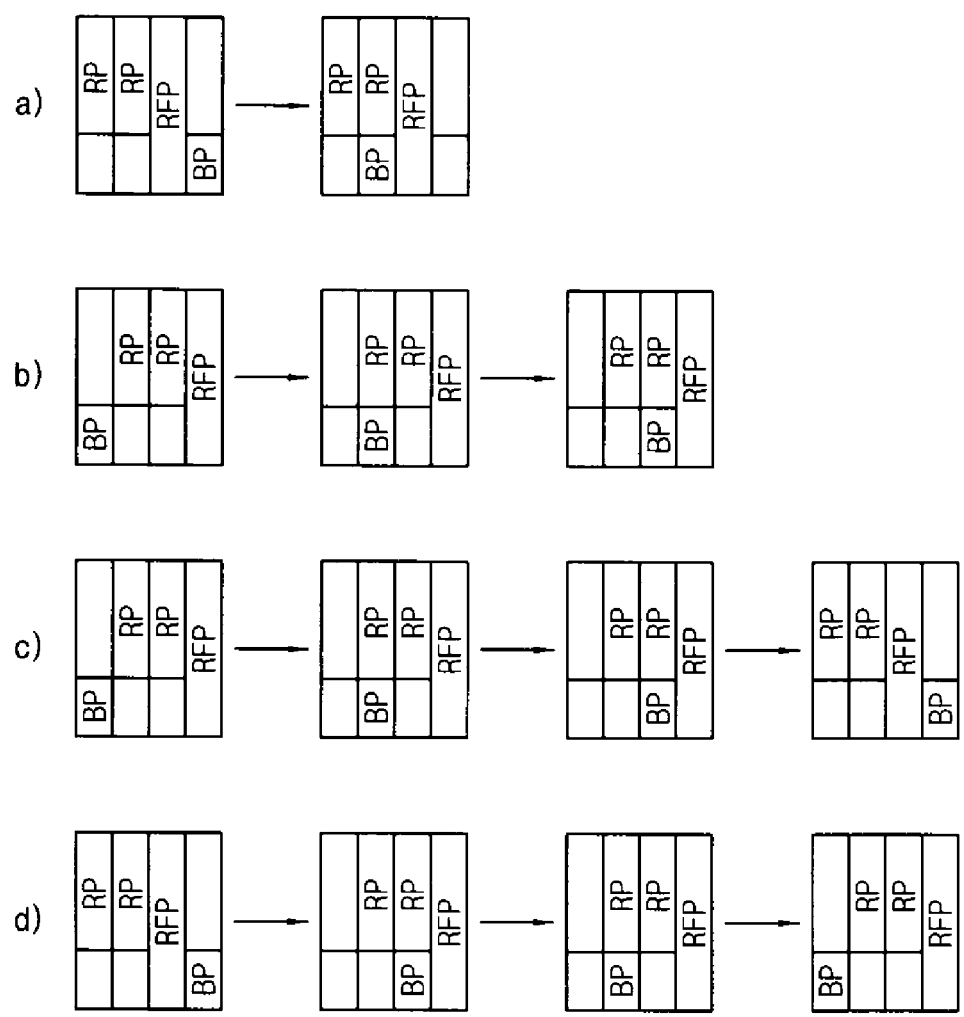
FIG. 11 is a diagram illustrating an operation of a transmitting backward channel management unit in the slave network interface of FIG. 10, according to an embodiment of the inventive concept.

FIG. 11 is a diagram illustrating an operation of a transmitting backward channel management unit included in the slave network interface of FIG. 10, according to an embodiment of the inventive concept.

Transmitting backward channel management unit 124d manages third sub-channel SCH3 and fourth sub-channel SCH4 using sub-channel handshaking as follows.

Where both third sub-channel SCH3 and fourth sub-channel SCH4 are available, transmitting backward channel management unit 124d maintains an order of read data packet RP, read data/response packet RFP, and write response packet BP that are serialized in the third sub-channel output buffer SOBF3 and the fourth sub-channel output buffer SOBF4. Therefore, read data packet RP, read data/response packet RFP and write response packet BP are transmitted at different times from each other.

As illustrated in a diagram "A" of FIG. 11, where both third sub-channel SCH3 and fourth sub-channel SCH4 are blocked and write response packet BP precedes read data/response packet RFP in third sub-channel output buffer SOBF3 and fourth sub-channel output buffer SOBF4, transmitting backward channel management unit 124d reorders write response packet BP and read data/response packet RFP and moves write response packet BP in fourth sub-channel output buffer SOBF4 so that write response packet BP is merged with the frontmost read data packet RP. Therefore, transmitting backward channel management unit 124d transmits read data packet RP and write response packet BP at the same time using third sub-channel SCH3 and fourth sub-channel SCH4, respectively, which can increase utilization of backward channel BCH.

As illustrated in a diagram "B" of FIG. 11, where both third sub-channel SCH3 and fourth sub-channel SCH4 are blocked and write response packet BP follows read data/response packet RFP in third sub-channel output buffer SOBF3 and fourth sub-channel output buffer SOBF4, transmitting backward channel management unit 124d moves write response packet BP in fourth sub-channel output buffer SOBF4 so that write response packet BP is merged with the frontmost read data packet RP. Therefore, transmitting backward channel management unit 124d may transmit read data packet RP and write response packet BP at the same time using third sub-channel SCH3 and fourth sub-channel SCH4, respectively, such that utilization of backward channel BCH may increase.

As illustrated in a diagram "C" of FIG. 11, where only third sub-channel SCH3 is blocked and write response packet BP follows read data/response packet RFP in third sub-channel output buffer SOBF3 and fourth sub-channel output buffer SOBF4, transmitting backward channel management unit 124d may reorder write response packet BP and read data/response packet RFP and move write response packet BP in fourth sub-channel output buffer SOBF4 so that write response packet BP precedes read data/response packet RFP and read data packet RP. Therefore, transmitting backward channel management unit 124d transmits write response packet BP before read data/response packet RFP and read data packet RP.

As illustrated in a diagram "D" of FIG. 11, where only fourth sub-channel SCH4 is blocked and write response packet BP precedes read data/response packet RFP in third sub-channel output buffer SOBF3 and fourth sub-channel output buffer SOBF4, transmitting backward channel management unit 124d reorders write response packet BP and read data/response packet RFP and moves write response packet BP in fourth sub-channel output buffer SOBF4 so that write response packet BP follows the rearmost read data packet RP. Therefore, transmitting backward channel management unit 124d transmits read data/response packet RFP and read data packet RP before write response packet BP.

Packets transmitted to NoC backbone 120 through forward channel FCH and backward channel BCH according to a method described above, may be routed and arbitrated between IPs 110 in NoC backbone 120.

Figure 12:
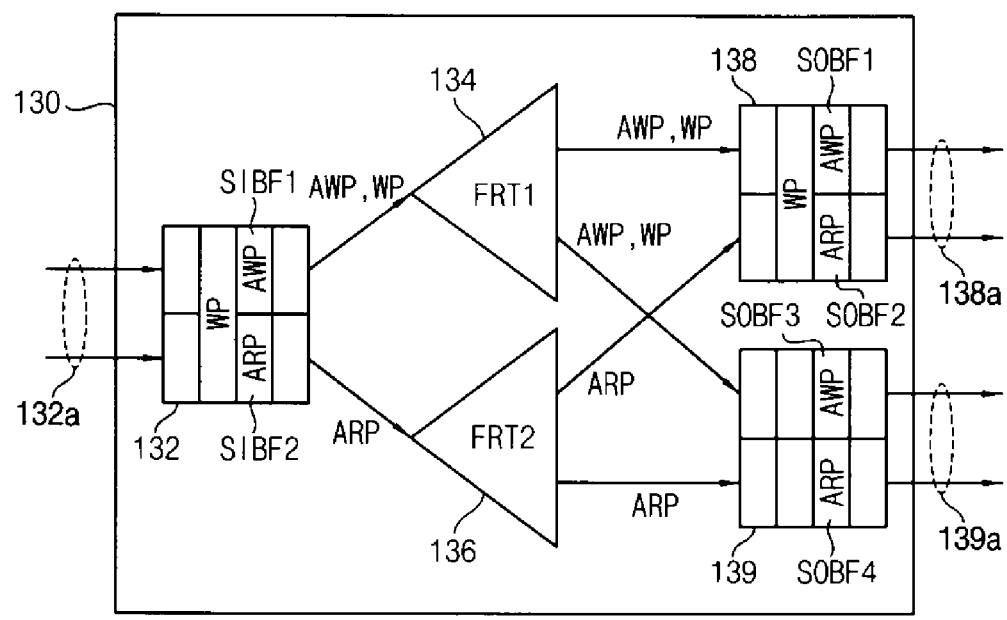
FIG. 12 is a block diagram illustrating an example of a forward channel routing node included in an NoC backbone of FIG. 8, according to an embodiment of the inventive concept.

FIG. 12 is a block diagram illustrating an example of a forward channel routing node included in the NoC backbone of FIG. 8, according to an embodiment of the inventive concept.

Referring to FIG. 12, a forward channel routing node 130 routes write address packet AWP, write data packet WP and read address packet ARP received through one forward channel 132a to two forward channels 138a and 139a. Forward channel routing node 130 comprises one input buffer 132, two forward routers 134 and 136, and two output buffers 138 and 139. Input buffer 132 comprises a first sub-channel input buffer SIBF1 and a second sub-channel input buffer SIBF2. First output buffer 138 comprises a first sub-channel output buffer SOBF1 and a second sub-channel output buffer SOBF2. Second output buffer 139 comprises a third sub-channel output buffer SOBF3 and a fourth sub-channel output buffer SOBF4.

Input buffer 132 stores write address packet AWP received through first sub-channel SCH1 of forward channel 132a into first sub-channel input buffer SIBF1. It also stores read address packet ARP received through second sub-channel SCH2 of the forward channel 132a into the second sub-channel input buffer SIBF2. It also stores write data packet WP received through both first sub-channel SCH1 and second sub-channel SCH2 of forward channel 132a into first sub-channel input buffer SIBF1 and second sub-channel input buffer SIBF2.

First forward router FRT1 134 routes write address packet AWP stored in input buffer 132 to one of first output buffer 138 and second output buffer 139 based on direction information (e.g., the write address) in write address packet AWP. It also routes write data packet WP stored in input buffer 132 to one of first output buffer 138 and second output buffer 139 based on pathQ information of write address packet AWP, which includes a direction history of write address packet AWP.

Second forward router FRT2 136 routes read address packet ARP stored in input buffer 132 to one of first output buffer 138 and second output buffer 139 based on direction information (e.g., the read address) in read address packet ARP.

First output buffer 138 transmits write address packet AWP, write data packet WP and read address packet ARP received from first forward router FRT1 134 and second forward router FRT2 136 using forward channel 138a in a received order. For example, first sub-channel output buffer SOBF1 may store write address packet AWP provided from first forward router FRT1 134, and it may transmit write address packet AWP using first sub-channel SCH1 of forward channel 138a. Second sub-channel output buffer SOBF2 stores read address packet ARP provided from second forward router FRT2 136, and it transmits read address packet ARP using second sub-channel SCH2 of forward channel 138a. First sub-channel output buffer SOBF1 and second sub-channel output buffer SOBF2 store write data packet WP provided from first forward router FRT1 134, and they transmit write data packet WP using both first sub-channel SCH1 and second sub-channel SCH2 of forward channel 138a.

Second output buffer 139 transmits write address packet AWP, write data packet WP and read address packet ARP received from first forward router FRT1 134 and second forward router FRT2 136 using the forward channel 139a in a received order. For example, third sub-channel output buffer SOBF3 may store write address packet AWP provided from first forward router FRT1 134, and it may transmit write address packet AWP using first sub-channel SCH1 of the forward channel 139a. Fourth sub-channel output buffer SOBF4 stores read address packet ARP provided from second forward router FRT2 136, and it transmits read address packet ARP using second sub-channel SCH2 of forward channel 139a. Third sub-channel output buffer SOBF3 and fourth sub-channel output buffer SOBF4 store write data packet WP provided from first forward router FRT1 134, and they transmit write data packet WP using both first sub-channel SCH1 and second sub-channel SCH2 of the forward channel 139a.

Figure 13:
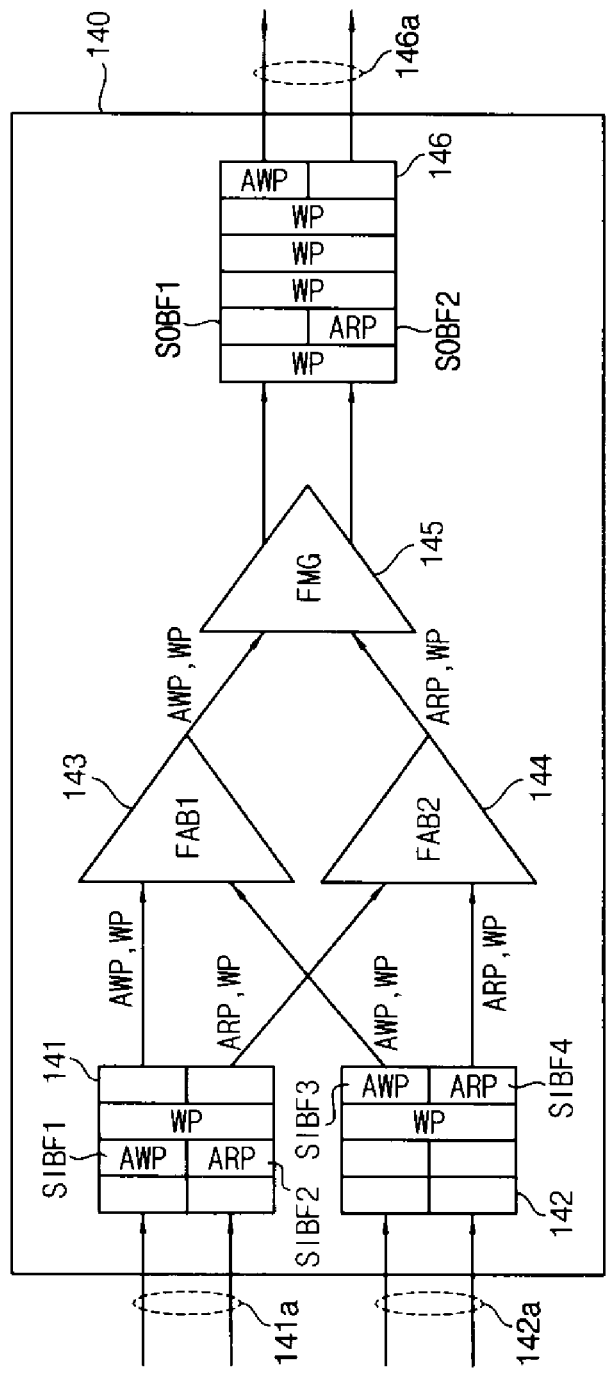
FIG. 13 is a block diagram illustrating an example of a forward channel arbitrating node included in the NoC backbone of FIG. 8, according to an embodiment of the inventive concept.

FIG. 13 is a block diagram illustrating an example of a forward channel arbitrating node included in the NoC backbone of FIG. 8, according to an embodiment of the inventive concept.

Referring to FIG. 13, a forward channel arbitrating node 140 arbitrates write address packets AWP, write data packets WP and read address packets ARP received through two forward channels 141a and 142a to provide write address packets AWP, write data packets WP, and read address packets ARP to one forward channel 146a. Forward channel arbitrating node 140 comprises two input buffers 141 and 142, two forward arbiters 143 and 144, one forward merge unit FMG 145, and one output buffer 146. First input buffer 141 comprises a first sub-channel input buffer SIBF1 and a second sub-channel input buffer SIBF2. Second input buffer 142 comprises a third sub-channel input buffer SIBF3 and a fourth sub-channel input buffer SIBF4. Output buffer 146 comprises a first sub-channel output buffer SOBF1 and a second sub-channel output buffer SOBF2.

First input buffer 141 stores write address packet AWP received through first sub-channel SCH1 of forward channel 141a into first sub-channel input buffer SIBF1. It stores read address packet ARP received through second sub-channel SCH2 of forward channel 141a into the second sub-channel input buffer SIBF2. It also stores write data packet WP received through both first sub-channel SCH1 and second sub-channel SCH2 of forward channel 141a into first sub-channel input buffer SIBF1 and second sub-channel input buffer SIBF2.

Second input buffer 142 stores write address packet AWP received through first sub-channel SCH1 of forward channel 142a into third sub-channel input buffer SIBF3. It stores read address packet ARP received through second sub-channel SCH2 of forward channel 142a into fourth sub-channel input buffer SIBF4. It also stores write data packet WP received through both first sub-channel SCH1 and second sub-channel SCH2 of forward channel 142a into third sub-channel input buffer SIBF3 and fourth sub-channel input buffer SIBF4.

First forward arbiter FAB1 143 arbitrates between write address packets AWP received from first input buffer 141 and second input buffer 142 based on a priority information of write address packets AWP to provide write address packets AWP to output buffer 146 through forward merge unit 145. If write address packets AWP received from first input buffer 141 and second input buffer 142 have the same priority, first forward arbiter FAB1 143 arbitrates between write address packets AWP based on least recently granted (LRG) information of write address packets AWP. First forward arbiter FAB1 143 arbitrates between write data packets WP received from first input buffer 141 and second input buffer 142 based on pathQ information of write address packets AWP, which comprises a direction history of write address packets AWP, and it provides the write data packets WP to output buffer 146 through forward merge unit 145. First forward arbiter FAB1 143 arbitrates between write address packet AWP and write data packet WP received from first input buffer 141 and second input buffer 142 such that write data packet WP is processed first before write address packet AWP.

Second forward arbiter FAB2 144 arbitrates between read address packets ARP received from first input buffer 141 and second input buffer 142 based on priority information of read address packets ARP, and it provides the read address packets ARP to output buffer 146 through forward merge unit 145. If the read address packets ARP received from first input buffer 141 and second input buffer 142 have the same priority, second forward arbiter FAB2 144 arbitrates between the read address packets ARP based on LRG information of the read address packets ARP. Second forward arbiter FAB2 144 arbitrates between the write data packets WP received from first input buffer 141 and second input buffer 142 based on the pathQ information of the write address packets AWP, which comprises a direction history of the write address packets AWP, and it provides the write data packets WP to output buffer 146 through forward merge unit 145. Second forward arbiter FAB2 144 arbitrates between read address packet ARP and write data packet WP received from first input buffer 141 and second input buffer 142 based on priority information of read address packet ARP and write data packet WP, and it provides read address packet ARP and write data packet WP to output buffer 146 through forward merge unit 145. If read address packet ARP and write data packet WP received from first input buffer 141 and second input buffer 142 have the same priority, second forward arbiter FAB2 144 arbitrates between read address packet ARP and write data packet WP based on LRG information of read address packet ARP and write data packet WP.

Forward merge unit 145 receives write address packet AWP, write data packet WP and read address packet ARP from first forward arbiter FAB1 143 and second forward arbiter FAB2 144. It stores write address packet AWP in first sub-channel output buffer SOBF1 of output buffer 146, stores read address packet ARP in second sub-channel output buffer SOBF2 of output buffer 146, and stores write data packet WP in both first sub-channel output buffer SOBF1 and second sub-channel output buffer SOBF2 of output buffer 146. Forward merge unit 145 merges write address packet AWP received from first forward arbiter FAB1 143 and read address packet ARP received from second forward arbiter FAB2 144 before storing write address packet AWP and read address packet ARP in output buffer 146 so that write address packet AWP and read address packet ARP are stored in first sub-channel output buffer SOBF1 and second sub-channel output buffer SOBF2, respectively, at the same time, if write address packet AWP and read address packet ARP are originated from different master Ws 112.

Output buffer 146 transmits write address packet AWP, write data packet WP, and read address packet ARP received from forward merge unit 145 using the forward channel 146a in a received order. For example, first sub-channel output buffer SOBF1 may transmit write address packet AWP using first sub-channel SCH1 of forward channel 146a. Second sub-channel output buffer SOBF2 transmits read address packet ARP using second sub-channel SCH2 of forward channel 146a. First sub-channel output buffer SOBF1 and second sub-channel output buffer SOBF2 transmit write data packet WP using both first sub-channel SCH1 and second sub-channel SCH2 of forward channel 146a.

Figure 14:
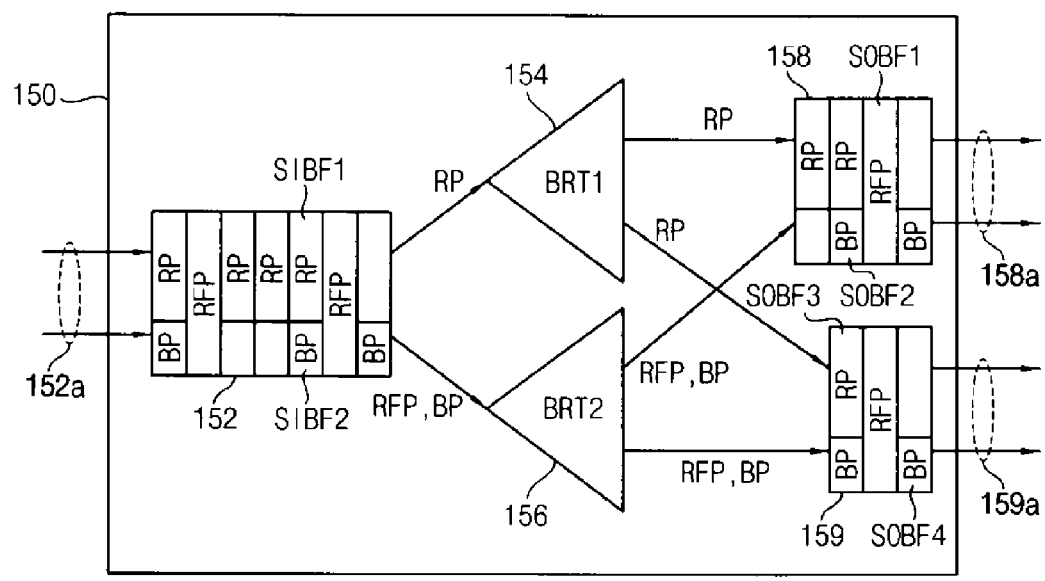
FIG. 14 is a block diagram illustrating an example of a backward channel routing node included in an NoC backbone of FIG. 10, according to an embodiment of the inventive concept.

FIG. 14 is a block diagram illustrating an example of a backward channel routing node included in the NoC backbone of FIG. 10, according to an embodiment of the inventive concept.

Referring to FIG. 14, a backward channel routing node 150 routes read data packet RP, read data/response packet RFP, and write response packet BP received through one backward channel 152a to two backward channels 158a and 159a. Backward channel routing node 150 comprises one input buffer 152, two backward routers 154 and 156, and two output buffers 158 and 159. Input buffer 152 comprises a first sub-channel input buffer SIBF1 and a second sub-channel input buffer SIBF2. First output buffer 158 comprises a first sub-channel output buffer SOBF1 and a second sub-channel output buffer SOBF2. Second output buffer 159 comprises a third sub-channel output buffer SOBF3 and a fourth sub-channel output buffer SOBF4.

Input buffer 152 stores read data packet RP received through first sub-channel SCH1 of backward channel 152a into first sub-channel input buffer SIBF1. It also stores write response packet BP received through second sub-channel SCH2 of backward channel 152a into second sub-channel input buffer SIBF2. It also stores read data/response packet RFP received through both first sub-channel SCH1 and second sub-channel SCH2 of backward channel 152a into first sub-channel input buffer SIBF1 and second sub-channel input buffer SIBF2.

Second backward router BRT2 156 routes write response packet BP stored in input buffer 152 to one of first output buffer 158 and second output buffer 159 based on direction information in write response packet BP, and it routes read data/response packet RFP stored in input buffer 152 to one of first output buffer 158 and second output buffer 159 based on direction information in read data/response packet RFP.

First backward router BRT1 154 routes read data packet RP stored in input buffer 152 to one of first output buffer 158 and second output buffer 159 based on pathQ information of read data/response packet RFP, which includes a direction history of read data/response packet RFP.

First output buffer 158 transmits read data packet RP, read data/response packet RFP and write response packet BP received from first backward router BRT1 154 and second backward router BRT2 156, through backward channel 158a, in a received order. For example, first sub-channel output buffer SOBF1 may store read data packet RP provided from first backward router BRT1 154, and it may transmit read data packet RP using first sub-channel SCH1 of backward channel 158a. Second sub-channel output buffer SOBF2 stores write response packet BP provided from second backward router BRT2 156, and it transmits write response packet BP using second sub-channel SCH2 of backward channel 158a. First sub-channel output buffer SOBF1 and second sub-channel output buffer SOBF2 store read data/response packet RFP provided from second backward router BRT2 156, and they transmit read data/response packet RFP using both first sub-channel SCH1 and second sub-channel SCH2 of the backward channel 158a.

Second output buffer 159 transmits read data packet RP, read data/response packet RFP and write response packet BP received from the first backward router BRT1 154 and second backward router BRT2 156 using backward channel 159a in a received order. For example, third sub-channel output buffer SOBF3 may store read data packet RP provided from first backward router BRT1 154, and it may transmit read data packet RP using first sub-channel SCH1 of backward channel 159a. Fourth sub-channel output buffer SOBF4 stores write response packet BP provided from second backward router BRT2 156, and it transmits write response packet BP using second sub-channel SCH2 of the backward channel 159a. Third sub-channel output buffer SOBF3 and fourth sub-channel output buffer SOBF4 store read data/response packet RFP provided from second backward router BRT2 156, and they transmit read data/response packet RFP using both first sub-channel SCH1 and second sub-channel SCH2 of the backward channel 159a.

Figure 15:
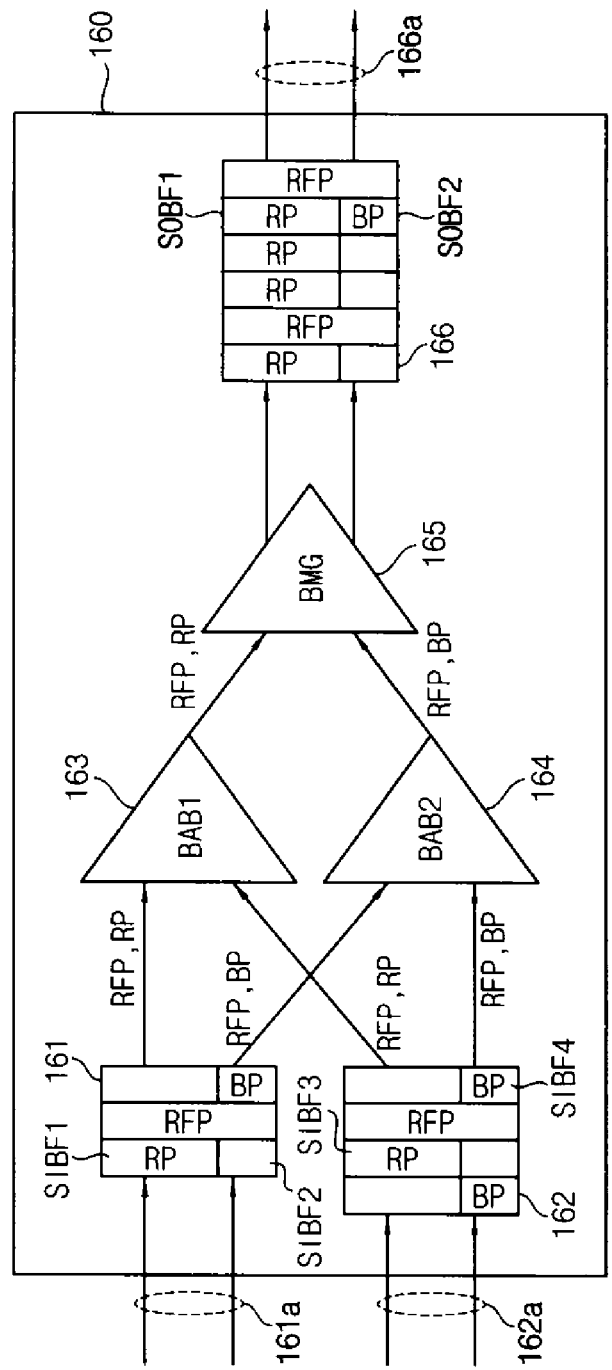
FIG. 15 is a block diagram illustrating an example of a backward channel arbitrating node included in the NoC backbone of FIG. 10, according to an embodiment of the inventive concept.

FIG. 15 is a block diagram illustrating an example of a backward channel arbitrating node in the NoC backbone of FIG. 10, according to an embodiment of the inventive concept.

Referring to FIG. 15, a backward channel arbitrating node 160 arbitrates read data packets RP, read data/response packets RFP and write response packets BP received through two backward channels 161a and 162a, and it provides them to one backward channel 166a. Backward channel arbitrating node 160 comprises two input buffers 161 and 162, two backward arbiters 163 and 164, one backward merge unit BMG 165, and one output buffer 166. First input buffer 161 comprises a first sub-channel input buffer SIBF1 and a second sub-channel input buffer SIBF2. Second input buffer 162 comprises a third sub-channel input buffer SIBF3 and a fourth sub-channel input buffer SIBF4. Output buffer 166 comprises a first sub-channel output buffer SOBF1 and a second sub-channel output buffer SOBF2.

First input buffer 161 stores read data packet RP received through first sub-channel SCH1 of backward channel 161a into first sub-channel input buffer SIBF1. It stores write response packet BP received through second sub-channel SCH2 of the backward channel 161a into the second sub-channel input buffer SIBF2. It also stores read data/response packet RFP received through both first sub-channel SCH1 and second sub-channel SCH2 of backward channel 161a into first sub-channel input buffer SIBF1 and second sub-channel input buffer SIBF2.

Second input buffer 162 stores read data packet RP received through first sub-channel SCH1 of the backward channel 162a into the third sub-channel input buffer SIBF3. It also stores write response packet BP received through second sub-channel SCH2 of backward channel 162a into fourth sub-channel input buffer SIBF4. It also stores read data/response packet RFP received through both first sub-channel SCH1 and second sub-channel SCH2 of the backward channel 162a into the third sub-channel input buffer SIBF3 and the fourth sub-channel input buffer SIBF4.

First backward arbiter BAB1 163 arbitrates between read data/response packets RFP received from first input buffer 161 and second input buffer 162 based on priority information of the read data/response packets RFP, and provides the read data/response packets RFP to the output buffer 166 through the backward merge unit 165. If the read data/response packets RFP received from first input buffer 161 and second input buffer 162 have the same priority, first backward arbiter BAB1 163 arbitrates between the read data/response packets RFP based on LRG information of the read data/response packets RFP. First backward arbiter BAB1 163 arbitrates between read data packets RP received from first input buffer 161 and second input buffer 162 based on pathQ information of the read data/response packets RFP, which comprises a direction history of the read data/response packets RFP, and it provides read data packets RP to the output buffer 166 through backward merge unit 165. First backward arbiter BAB1 163 may arbitrate between the read data/response packets RFP and read data packet RP received from first input buffer 161 and second input buffer 162 such that read data packet RP is processed first before the read data/response packets RFP.

Second backward arbiter BAB2 164 arbitrates between read data/response packets RFP received from first input buffer 161 and second input buffer 162 based on a priority information of read data/response packets RFP, and it provides the read data/response packets RFP to output buffer 166 through the backward merge unit 165. If the read data/response packets RFP received from first input buffer 161 and second input buffer 162 have the same priority, second backward arbiter BAB2 164 arbitrates between the read data/response packets RFP based on LRG information of read data/response packets RFP. Second backward arbiter BAB2 164 arbitrates between write response packets BP received from first input buffer 161 and second input buffer 162 based on priority information of the write response packets BP, and it provides the write response packets BP to output buffer 166 through backward merge unit 165. If the write response packets BP received from first input buffer 161 and second input buffer 162 have the same priority, second backward arbiter BAB2 164 arbitrates between write response packets BP based on LRG information of write response packets BP. Second backward arbiter BAB2 164 arbitrates between read data/response packet RFP and write response packet BP received from first input buffer 161 and second input buffer 162 based on a priority information of read data/response packet RFP and write response packet BP, and it provides read data/response packet RFP and write response packet BP to output buffer 166 through backward merge unit 165. If read data/response packet RFP and write response packet BP received from first input buffer 161 and second input buffer 162 have the same priority, second backward arbiter BAB2

164 arbitrates between the read data/response packet RFP and write response packet BP based on LRG information of the read data/response packet RFP and write response packet BP.

Backward merge unit 165 receives read data packets RP, read data/response packets RFP and write response packets BP from first backward arbiter BAB1 163 and second backward arbiter BAB2 164. It stores read data packet RP in first sub-channel output buffer SOBF1 of output buffer 166, stores write response packet BP in second sub-channel output buffer SOBF2 of output buffer 166, and stores read data/response packet RFP in both first sub-channel output buffer SOBF1 and second sub-channel output buffer SOBF2 of output buffer 166. Backward merge unit 165 merges read data packet RP received from first backward arbiter BAB1 163 and write response packet BP received from second backward arbiter BAB2 164 before storing read data packet RP and write response packet BP in output buffer 166. It performs those operations such that read data packet RP and write response packet BP are stored in first sub-channel output buffer SOBF1 and second sub-channel output buffer SOBF2, respectively, at the same time, if read data packet RP and write response packet BP are originated from different slave IPs 114.

Output buffer 166 transmits read data packets RP, read data/response packets RFP and write response packets BP received from backward merge unit 165 using backward channel 166a in a received order. For example, first sub-channel output buffer SOBF1 may transmit read data packet RP using first sub-channel SCH1 of backward channel 166a. Second sub-channel output buffer SOBF2 transmits write response packet BP using second sub-channel SCH2 of the backward channel 166a. First sub-channel output buffer SOBF1 and second sub-channel output buffer SOBF2 transmits read data/response packet RFP using both first sub-channel SCH1 and second sub-channel SCH2 of the backward channel 166a.

For ease of explanation, forward channel routing node 130 and backward channel routing node 150 are described as having a one input and two outputs in the examples of FIGS. 12 and 14, and the forward channel arbitrating node 140 and the backward channel arbitrating node 160 are described as having a two inputs and one output in the examples of FIGS. 13 and 15. Nevertheless, the embodiments are not limited to these characteristics.

The foregoing is illustrative of the inventive concept and is not to be construed as limiting thereof. Although a few example embodiments have been described, those skilled in the art will readily appreciate that many modifications are possible in the described embodiments without materially departing from the scope of the inventive concept. Accordingly, all such modifications are intended to be included within the scope of the inventive concept as defined in the claims.

What is claimed is:

1. A method of managing a backbone channel that transmits first through third channel packets among Advanced eXtensible Interface (AXI) 5 channel packets, comprising:
    dividing the backbone channel into a first sub-channel and a second sub-channel;
    transmitting the first channel packet through the first sub-channel;
    transmitting the second channel packet through the second sub-channel; and
    transmitting the third channel packet through both the first sub-channel and the second sub-channel.

2. The method of claim 1, wherein, where both the first sub-channel and the second sub-channel are blocked, the first channel packet and the second channel packet are merged and are transmitted at the same time through the first sub-channel and the second sub-channel, respectively.

3. The method of claim 1, wherein, where both the first sub-channel and the second sub-channel are available, the first channel packet, the second channel packet, and the third channel packet are transmitted at different times from each other.

4. The method of claim 1, wherein, where the first sub-channel is blocked, the first channel packet, the second channel packet, and the third channel packet are reordered so that the second channel packet is transmitted before the first channel packet.

5. The method of claim 1, wherein, where the second sub-channel is blocked, the first channel packet, the second channel packet, and the third channel packet are reordered so that the first channel packet and the third channel packet are transmitted before the second channel packet.

6. The method of claim 1, wherein the backbone channel is a forward channel, and wherein the first channel packet is a write address packet among the AXI 5 channel packets, the second channel packet is a read address packet among the AXI 5 channel packets, and the third channel packet is a write data packet among the AXI 5 channel packets.

7. The method of claim 6, further comprising:
    routing the write address packet, the read address packet, and the write data packet, which are serialized in a first forward channel, to a second forward channel and a third forward channel using a first router and a second router,
    wherein the first router routes the write address packet received through a first sub-channel of the first forward channel to a first sub-channel of the second forward channel and a first sub-channel of the third forward channel, and routes the write data packet received through the first forward channel to the second forward channel and the third forward channel, and
    wherein the second router routes the read address packet received through a second sub-channel of the first forward channel to a second sub-channel of the second forward channel and a second sub-channel of the third forward channel.

8. The method of claim 7, wherein the first router routes the write address packet based on direction information included in the write address packet, and routes the write data packet based on pathQ information of the write address packet, which includes a direction history of the write address packet, and
    wherein the second router routes the read address packet based on direction information included in the read address packet.

9. The method of claim 6, further comprising:
    arbitrating between write address packets, read address packets, and write data packets, which are serialized in a first forward channel and a second forward channel, and providing the write address packets, the read address packets and the write data packets to a third forward channel using a first arbiter, a second arbiter, and a merge unit,
    wherein the first arbiter arbitrates between the write address packets, which are received through a first sub-channel of the first forward channel and a first sub-channel of the second forward channel, and provides the write address packets to a first sub-channel of the third forward channel, and it arbitrates between the write data packets, which are received through the first forward channel and the second forward channel, and provides the write data packets to the third forward channel, wherein the second arbiter arbitrates between the read address packets, which are received through a second sub-channel of the first forward channel and a second sub-channel of the second forward channel, and provides the read address packets to a second sub-channel of the third forward channel, and it arbitrates between the write data packets received through the first forward channel and the second forward channel and provides the write data packets to the third forward channel, and wherein the merge unit transmits the write address packet, which is received from the first arbiter, and the read address packet, which is received from the second arbiter, at the same time using the first sub-channel and the second sub-channel of the third forward channel, respectively, where the write address packet and the read address packet originate from different masters.

10. The method of claim 9, wherein the first arbiter and the second arbiter:
arbitrate between the write data packets based on pathQ information of the write address packets, which includes a direction history of the write address packets;
arbitrate between the write address packets, between the read address packets and between the read address packet and the write data packet based on priority information and least recently granted (LRG) information; and
arbitrate between the write address packet and the write data packet such that the write data packet is processed first before the write address packet.

11. The method of claim 1, wherein the backbone channel is a backward channel;
wherein the first channel packet is a read data packet among the AXI 5 channel packets;
the second channel packet is a write response packet among the AXI 5 channel packets; and
the third channel packet is a read data with read response packet among the AXI 5 channel packets.

12. The method of claim 11, further comprising:
routing the read data packet, the write response packet and the read data with read response packet, which are serialized in a first backward channel, to a second backward channel and a third backward channel using a first router and a second router,
wherein the first router routes the read data packet received through a first sub-channel of the first backward channel to a first sub-channel of the second backward channel and a first sub-channel of the third backward channel, and
wherein the second router routes the write response packet received through a second sub-channel of the first backward channel to a second sub-channel of the second backward channel and a second sub-channel of the third backward channel, and routes the read data with read response packet received through the first backward channel to the second backward channel and the third backward channel.

13. The method of claim 12, wherein the first router routes the read data packet based on pathQ information of the read data with read response packet, which includes a direction history of the read data with read response packet, and
wherein the second router routes the write response packet based on direction information included in the write response packet, and routes the read data with read response packet based on direction information included in the read data with read response packet.

14. The method of claim 11, further comprising:
arbitrating between read data packets, write response packets and read data with read response packets, which are serialized in a first backward channel and a second backward channel, to provide the read data packets, the write response packets and the read data with read response packets to a third backward channel using a first arbiter, a second arbiter and a merge unit,
wherein the first arbiter arbitrates between the read data packets, which are received through a first sub-channel of the first backward channel and a first sub-channel of the second backward channel, to provide the read data packets to a first sub-channel of the third backward channel, and arbitrates between the read data with read response packets, which are received through the first backward channel and the second backward channel, to provide the read data with read response packets to the third backward channel,
wherein the second arbiter arbitrates between the write response packets, which are received through a second sub-channel of the first backward channel and a second sub-channel of the second backward channel, to provide the write response packets to a second sub-channel of the third backward channel, and arbitrates between the read data with read response packets received through the first backward channel and the second backward channel to provide the read data with read response packets to the third backward channel, and
wherein the merge unit transmits the read data packet, which is received from the first arbiter, and the write response packet, which is received from the second arbiter, at the same time using the first sub-channel and the second sub-channel of the third backward channel, respectively, when the read data packet and the write response packet are originated from different masters.

15. A backbone channel management apparatus that transmits first through third channel packets among Advanced eXtensible Interface (AXI) 5 channel packets through a backbone channel, comprising:
a transmitting interface unit comprising:
an input buffer having first through third input packet buffers that store the first through third channel packets, respectively; and
a transmitting channel management unit configured to divide the backbone channel into a first sub-channel and a second sub-channel, to transmit the first channel packet provided from the first input packet buffer using the first sub-channel, to transmit the second channel packet provided from the second input packet buffer using the second sub-channel, and to transmit the third channel packet provided from the third input packet buffer using both the first sub-channel and the second sub-channel; and
a receiving interface unit comprising:
an output buffer having first through third output packet buffers; and
a receiving channel management unit configured to store the first channel packet received through the first sub-channel into the first output packet buffer, to store the second channel packet received through the second sub-channel into the second output packet buffer, and to store the third channel packet received through both the first sub-channel and the second sub-channel into the third output packet buffer.

16. The apparatus of claim 15, wherein where both the first sub-channel and the second sub-channel are blocked, the first channel packet and the second channel packet are merged and transmitted at the same time through the first sub-channel and the second sub-channel, respectively.

17. The apparatus of claim 15, wherein, where both the first sub-channel and the second sub-channel are available, the first channel packet, the second channel packet, and the third channel packet are transmitted at different times from each other.

18. The apparatus of claim 15 wherein where the first sub-channel is blocked, the first channel packet, the second channel packet, and the third channel packet are reordered so that the second channel packet is transmitted before the first channel packet.

19. The apparatus of claim 15, wherein, where the second sub-channel is blocked, the first channel packet, the second channel packet, and the third channel packet are reordered so that the first channel packet and the third channel packet are transmitted before the second channel packet.

20. The apparatus of claim 15, wherein the backbone channel is a forward channel, and the first channel packet is a write address packet among the AXI 5 channel packets, the second channel packet is a read address packet among the AXI 5 channel packets, and the third channel packet is a write data packet among the AXI 5 channel packets.

* * * * *